United States Patent [19]
Brumfield

[11] Patent Number: 4,779,521
[45] Date of Patent: Oct. 25, 1988

[54] SELECTIVE PRECISION METERING OF GROUND COFFEE AND OTHER FUNGIBLE MATERIALS

[76] Inventor: William L. Brumfield, P.O. Box 212, Ocean Springs, Miss. 39564

[21] Appl. No.: 29,244

[22] Filed: Mar. 23, 1987

[51] Int. Cl.$^4$ .................... A47J 31/40; G01F 11/28
[52] U.S. Cl. ................................ 99/289 R; 222/307; 222/457
[58] Field of Search ............ 99/289 R, 289 T, 289 D, 99/289 P, 280, 287; 222/307, 308, 440, 457

[56] References Cited

U.S. PATENT DOCUMENTS

| | | | |
|---|---|---|---|
| 250,159 | 11/1881 | Mills | 222/457 X |
| 1,273,720 | 7/1918 | Bachand | 222/307 |
| 1,866,781 | 7/1932 | Ullrich | 222/457 X |
| 3,089,404 | 5/1963 | Parraga | 99/289 R |
| 4,130,149 | 12/1978 | Hausam | 222/307 X |
| 4,300,442 | 11/1981 | Martin | 99/289 R |

FOREIGN PATENT DOCUMENTS 1146322  5/1957  France ...................... 222/457

Primary Examiner—James Kee Chi
Attorney, Agent, or Firm—Richard C. Litman

[57] ABSTRACT

Apparatus for precision metering of selected amounts of fungible or granular material such as coffee consisting of a frame, a hopper supported by the frame having a large upper storage area and communicating with a small lower vertically oriented exiting trough, horizontal sliding plate extending below a forward lip of the exiting trough, the horizontal sliding plate having an edge contacting the extended rear lip and for moving the plate to traverse the rear lip during metering of the granular material, receptacle securably attached on an under side of the horizontal sliding plate, and the horizontal sliding plate cooperating with the rear lip during traverse of the horizontal sliding plate for filling the receptacle means by the rear lip causing the metering of the granular material on the sliding plate to dump into the receptacle. The forward lip is adjustable for controlling the magnitude of metering of the granular material. The horizontal sliding plate is spring biased for returning the sliding plate to a position for receiving the metering of the granular material. The horizontal sliding plate is essentially U-shaped for retaining the granular material heaped between the U-shaped sides, the rear lip and that portion of the forward lip disposed in position for the metering of the granular material together with a vertical member engaging at the forward end of the horizontal sliding plate. The hopper is constructed of a transparent material. The hopper is provided with a cover sheet. The forward lip is controlled by a knob to provide adjustability in controlling the magnitude of metering of the granular material. The hopper is removable from the frame. The horizontal sliding sheet is tensioned by a spring for positioning it in a forward position and urging it against a vertical member engaging at the forward end of the horizontal sliding plate.

4 Claims, 2 Drawing Sheets

SELECTIVE PRECISION METERING OF GROUND COFFEE AND OTHER FUNGIBLE MATERIALS

BACKGROUND OF THE INVENTION

1. Field of the Invention

The invention relates to apparatus for selective precision metering of materials such as ground coffee and other fungible or granular material and its method of manufacture, and more particularly the invention is directed to apparatus for precision metering selected amounts of granular material such as coffee in which the apparatus consists of a frame, a hopper supported by and removable from the frame having a large upper storage area and communciating with a small lower vertically oriented exiting trough, horizontal sliding plate extending below a forward lip of the exiting trough, a horizontal sliding plate having an edge contacting the extended rear lip and for moving the plate to traverse the rear lip during metering of the granular material, receptacle means securably and disengageably attached on an under side of the horizontal sliding plate, and the horizontal sliding plate cooperating with the rear lip during traverse of the horizontal sliding plate for filling the receptacle means by the rear lip causing the metering of the granular material on the sliding plate to dump into the receptacle means.

The foodservice industry nationwide presently depends in a large part for its coffee requirements on delivery to outlets of premeasured, pre-packed bags of coffee. The reason coffee is delivered in this manner is to assure the outlet a potential of it preparing a cup of coffee of consistent strength, not varying with whoever makes it. While it serves this purpose splendidly, it does so at a high cost. By means of the present invention a simple piece of apparatus having a hopper, placement of bulk ground coffee is accepted in the hopper and with an action caused by placing a brewpan under the machine, an exact, measured amount of coffee ranging from 0.9 ounces (25.2 g) to 3.25 ounces (91.0 g) will be dispensed into the brewpan. Briefly the machine works so the brewpan engages the equipment, it will empty a previously measured amount of coffee into it. It does this by coming out the open end of a box under the hopper. As the loaded brewpan is removed from the dispenser, coffee is laid in the bottom of the box for the next use. This is done by allowing coffee to fall from the hopper into the box. The measurement is based on the distance of the discharge opening of the hopper to the bottom of the box. The amount of coffee dispensed may vary by changing the setting of the distance of the hopper discharge to the box.

In essence, then, with the aid of the apparatus of the present invention for selectively with precision metering of granular or fungible goods such as ground coffee, one now can purchase ground coffee in bulk for a particular food service operation instead of in premeasured, individual bags at savings of 20% to 30% to the operation with no loss of convenience or quality. With thousands of restaurants, institutions and the like where coffee purchases exceed $1,000 monthly and more, tremendous savings can be realized.

2. Description of the Prior art

Various prior art devices for making pre-packed bags, and the like, as well as apparatus and method of their construction in general, are found to be known and exemplary of the prior art are those devices for preparing coffee packaging and delivery of premeasured, pre-packed bags which are individually used to make one pot of coffee and that deliver in this manner an assurance to an outlet user a consistent strength of a cup of coffee, not varying with whoever makes it.

These known prior uses teach and disclose various types of measurement devices of sorts and of various manufactures and the like as well as methods of their construction, but none of them whether taken singly or in combination disclose the specific details of the combination of the invention in such a way as to bear upon the claims of the present invention.

SUMMARY OF THE INVENTION

An object, advantage and feature of the invention is to provide a novel apparatus for precision metering selected amounts of granular material such as coffee consisting of a frame, a hopper supported by the frame having a large upper storage area and communicating with a small lower vertically oriented exiting trough, horizontal sliding plate extending below a forward lip of the exiting trough, a horizontal sliding plate having an edge contacting the extended rear lip and for moving the plate to traverse the rear lip during metering of the granular material, receptacle securably and disengageably attached on an under side of the horizontal sliding plate, and the horizontal sliding plate cooperating with the rear lip during traverse of the horizontal sliding plate for filling the receptacle means by the rear lip causing the metering of the granular material on the sliding plate to dump into the receptacle.

Another object of the invention is directed further to a device providing for distribution of ground coffee that can be purchased in bulk by a food service operation instead of in premeasured individual bags with savings to the operator and with no loss of convenience or quality.

Also an object of the invention is to provide a simple and direct method for the improved construction of a metering apparatus measurement based on the distance of the discharge opening of the hopper to the bottom of the box.

A further object of the invention is to provide apparatus in which the amount of coffee dispensed may vary by changing the setting of the distance of the hopper discharge to the box.

These together with other objects and advantages which will become subsequently apparent reside in the details of the process and operation thereof as more fully hereinafter is described and claimed, reference being had to the accompanying drawings forming a part hereof, wherein like numerals refer to like parts throughout.

DESCRIPTION OF A PREFERRED EMBODIMENT OF THE INVENTION

Figure 1:
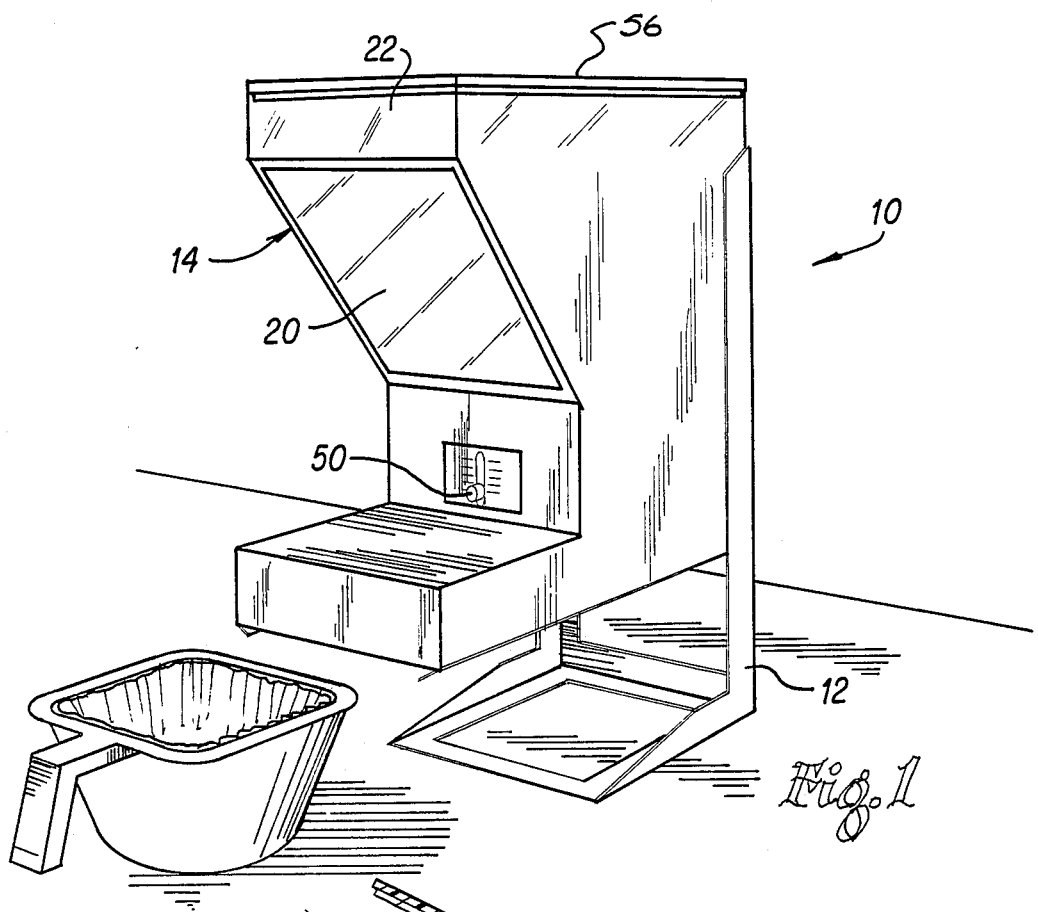
FIG. 1 is a perspective view of a precision metering apparatus and illustrating a typical installation thereof and according to a preferred embodiment and best mode of the present invention.

Referring now to the drawings there is shown precision metering apparatus 10 for providing selected amounts of granular material such as coffee including a supporting frame 12, a hopper 14 with a cover sheet at 56 supported by the frame 12 having a large upper storage area 16 and communicating with a small lower vertically oriented exiting trough 18, and in which the inclined side 20 and some of the top portions 22,24 are of a transparent plastic material.

Figure 2:
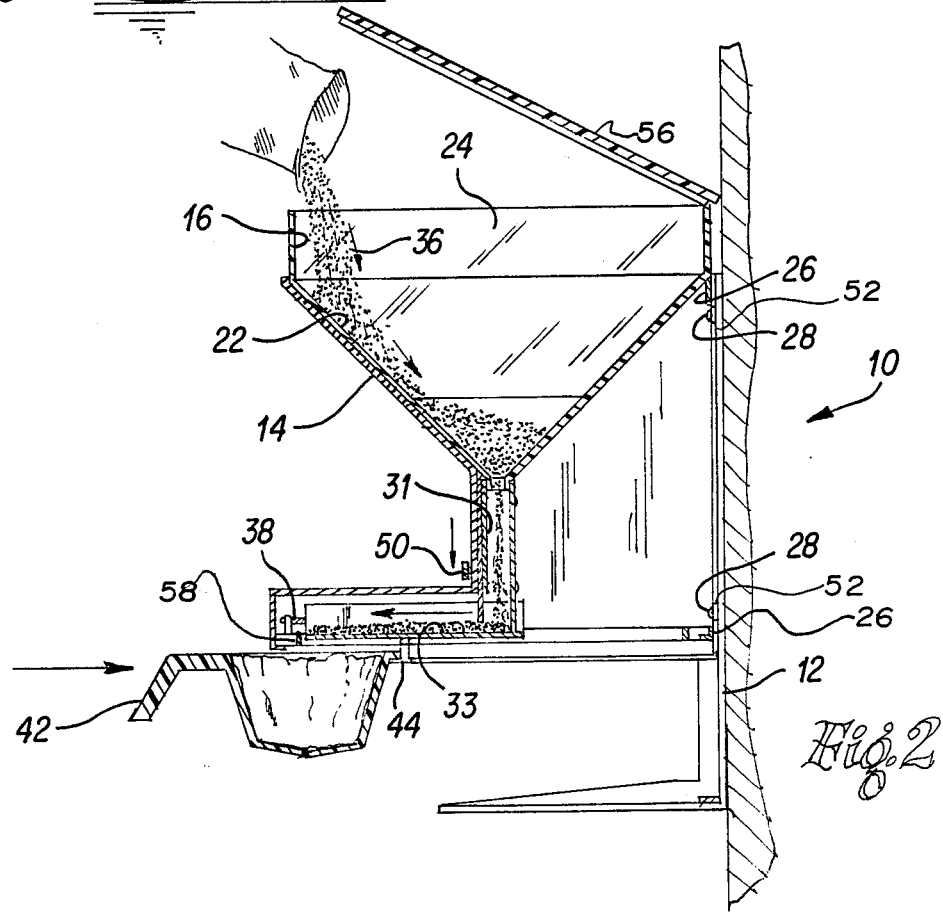
FIG. 2 is a sectional side view and embodying the concepts of the invention.

The hopper 14 is an integral body constructed to have recesses at 52 rear element 26 for engaging in supporting relation with bolt members 28 in the vertical inner side of the frame 12 and also being removable from frame 12 as shown in FIG. 2. Along the lower portion of the body of the hopper 14 is a horizontal essentially U-shaped sliding plate 30 shown in FIG. 2 at its forward most rest position and shown in FIG. 3 at it extended position, the sliding plate 30 extending below a forward lip 31 of the exiting trough 18, and the horizontal sliding plate 30 having its edge contacting the extended rear lip 32. The construction of the novel device provides that the sliding plate 30 is capable of manual movement from the position shown in FIG. 2 against a vertical abutment 58 so the plate traverses the rear lip 32 during metering of the granular material 36 shown by the arrow 40 in FIG. 3 and thereupon returns to its initial position by tensioned spring 38. A receptacle 42 is securably and disengageably attached on an under side 44 of the horizontal sliding plate 30, and the horizontal sliding plate cooperates with the rear lip 32 during traverse of the horizontal sliding plate for filling the receptacle 42 by the rear lip 32 causing the metering of the granular material 36 onto the sliding plate 30 between the U-shaped sides to dump the material 36 into the receptacle 42.

Figure 3:
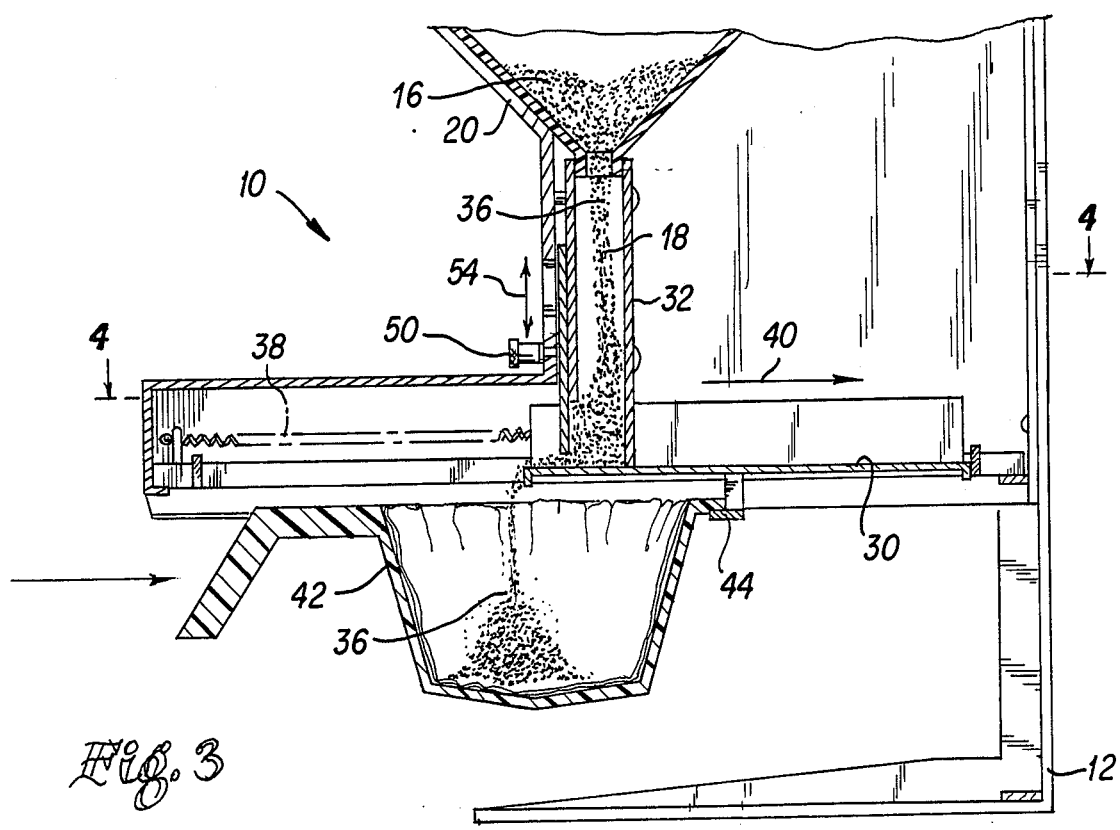
FIG. 3 is an enlarged sectional view of FIG. 2 thereof.
Figure 4:
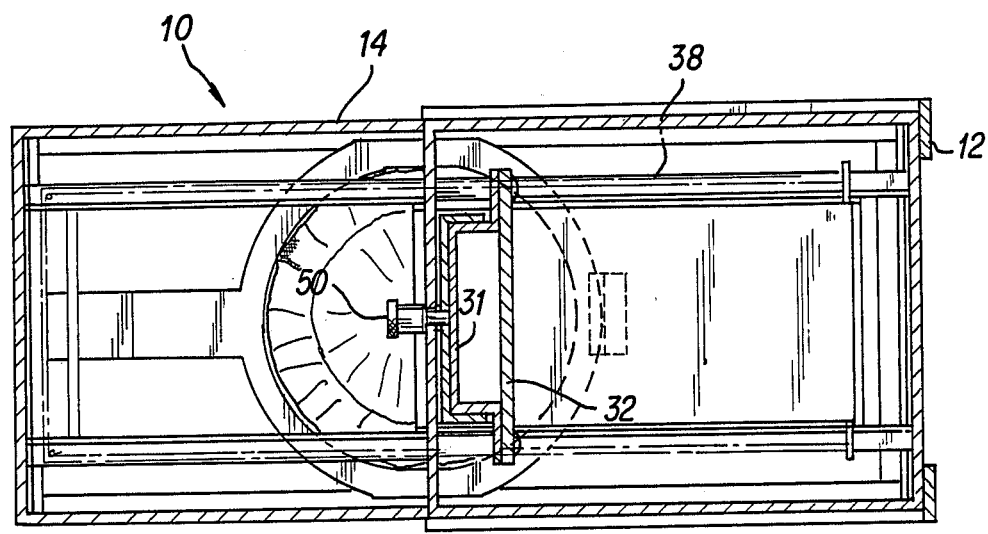
FIG. 4 is a sectional view taken along lines 4—4 of FIG. 3.

By manual adjustment of a knob 50 the metering is fixed by tightening the knob 50 and by loosening the knob 50 and displacing the knob up shown by the arrow 54 in FIG. 3 for more metered material 36 or lowering the knob 50 for less metered material 36, and tightening the knob in place obtains fixing the rate of metering desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed and desired to be secured by Letters patent is:

1. Apparatus for precision metering of selected amounts of fungible or granular material comprising:
   a frame,
   a hopper supported by the frame and having a large upper storage area,
   a small lower vertically oriented exiting trough connected to and communicating with said hopper,
   said exiting trough having a forward lip and an extended rear lip,
   a horizontal sliding plate having an underside extending below said forward lip and having a forward most position and a rear most position,
   the horizontal sliding plate having a surface contacting the extended rear lip and for allowing moving of the plate to traverse the rear lip during metering of the granular material,
   receptacle means securably and disengageably attached on an underside of the horizontal sliding plate,
   the horizontal plate cooperating with the rear lip during traverse of the horizontal sliding plate for filling the receptacle means by the rear lip causing the metering of the granular material on the sliding plate and to dump into the receptacle means,
   a vertical abutment limiting said sliding plate to its forward most position,
   a spring to urge said horizontal plate toward its forward most position,
   said horizontal sliding plate essentially U-shaped for retaining the granular material heaped between the U-shaped sides, the rear lip and that portion of the forward lip disposed in position for the metering of the granular material together with said vertical abutment limiting the forward most position of the horizontal sliding plate, and wherein
   the forward lip is controlled by a knob to provide adjustability in controlling the magnitude of metering of the granular material.

2. The apparatus of claim 1 wherein the hopper is constructed of transparent material.

3. The apparatus of claim 1 wherein the hopper is provided with a cover sheet.

4. The apparatus of claim 1 wherein the hopper is removable from the frame.

* * * * *